United States Patent
Zheng et al.

(10) Patent No.: US 12,250,940 B2
(45) Date of Patent: Mar. 18, 2025

(54) VISCOUS OUTDOOR MOSQUITO KILLING LAMP

(71) Applicant: NINGBO DAYANG TECHNOLOGY CO., LTD., Zhejiang (CN)

(72) Inventors: Jun Zheng, Zhejiang (CN); Yuanai Ning, Zhejiang (CN)

(73) Assignee: NINGBO DAYANG TECHNOLOGY CO., LTD., Ningbo (CN)

( * ) Notice: Subject to any disclaimer, the term of this patent is extended or adjusted under 35 U.S.C. 154(b) by 40 days.

(21) Appl. No.: 18/114,283

(22) Filed: Feb. 27, 2023

(65) Prior Publication Data

US 2023/0329213 A1    Oct. 19, 2023

(30) Foreign Application Priority Data

Apr. 15, 2022   (CN) .......................... 202220877443.9

(51) Int. Cl.
*A01M 1/14*     (2006.01)
*A01M 1/10*     (2006.01)

(52) U.S. Cl.
CPC ............ *A01M 1/145* (2013.01); *A01M 1/106* (2013.01)

(58) Field of Classification Search
CPC ............................. A01M 1/145; A01M 1/106
See application file for complete search history.

(56) References Cited

U.S. PATENT DOCUMENTS

| | | | | |
|---|---|---|---|---|
| 3,796,001 A * | 3/1974 | Jackson | .................. | A01M 1/08 43/139 |
| 5,259,153 A * | 11/1993 | Olive | .................... | A01M 1/145 136/291 |
| 6,574,914 B2 * | 6/2003 | Smith | ..................... | A01M 1/08 43/139 |
| 6,920,716 B2 * | 7/2005 | Kollars, Jr. | ............. | A01M 1/22 43/107 |
| 8,109,036 B1 * | 2/2012 | Wilbanks | .............. | A01M 1/223 43/112 |
| 10,337,675 B2 * | 7/2019 | Van Kleef | ............. | A01M 1/145 |
| 10,701,924 B2 * | 7/2020 | Zheng | .................... | A01M 1/08 |
| 11,241,003 B2 * | 2/2022 | Li | ............ | A01M 1/08 |
| 11,678,653 B1 * | 6/2023 | Cogley | ................... | A01M 5/04 43/111 |
| 2018/0310542 A1 * | 11/2018 | Pearce | .................... | A01M 1/02 |
| 2018/0343846 A1 * | 12/2018 | Horne | .................... | A01M 1/04 |
| 2023/0329214 A1 * | 10/2023 | Zheng | .................. | A01M 1/145 |

FOREIGN PATENT DOCUMENTS

| | | | | |
|---|---|---|---|---|
| CN | 104381231 A | * | 3/2015 | |
| CN | 205040481 U | * | 2/2016 | ............. A01M 1/04 |

OTHER PUBLICATIONS

Merged English translation of CN 205040481 (Year: 2016).*
English translation CN 104381231 (Year: 2015).*

* cited by examiner

*Primary Examiner* — Peter M Poon
*Assistant Examiner* — Marisa V Conlon

(57) ABSTRACT

The disclosure discloses a viscous outdoor mosquito killing lamp including a lamp body which includes a housing within which a lighting lamp is disposed; wherein the housing is provided with a trapping chamber, a sidewall of the trapping chamber is provided with a first through hole for flying insects to pass through; a trapping plate is detachably connected to the sidewall of the trapping chamber, and a viscous sticker is attached onto the trapping plate. The outdoor mosquito killing lamp is safe and environmentally friendly, and is more convenient to be cleaned up.

10 Claims, 6 Drawing Sheets

VISCOUS OUTDOOR MOSQUITO KILLING LAMP

CROSS-REFERENCE TO RELATED APPLICATIONS

The present disclosure claims priority of Chinese Utility Model application No. 202220877443.9, filed on Apr. 15, 2022, the entire contents of which are hereby incorporated by reference.

TECHNICAL FIELD

The disclosure relates to the technical field of mosquito killing lamp, and more particularly to a viscous outdoor mosquito killing lamp.

DESCRIPTION OF THE PRIOR ART

Mosquito killing lamps are mosquito killing tools developed based on mosquitoes' behaviors, such as phototaxis, moving with air flow, sensitive to temperature, gregariousness, especially the behavior of chasing carbon dioxide wind and sex pheromone. The mosquito killing lamps can be divided into electronic mosquito killing lamps, viscous mosquito killing lamps, negative pressure airflow mosquito catching lamps. The mosquito killing lamps are a relatively environmentally friendly way to kill mosquitoes, have characteristics of simple construction, cheap sale, aesthetically pleasing, small volume, power consumption, and the like. However, the structure of the existing mosquito lamps is simple, and the efficiency of killing mosquitoes is not high, which are not conducive to the killing of mosquitoes, therefore, the use of mosquito lamp is not convenient and effective. Furthermore, the existing mosquito killing lamps attract mosquitoes through a mosquito killing lamp, and then kill mosquitoes via potion or electric shock. The potion has some off-taste or toxicity, causes some discomfort, especially brings great damage to a baby's body. For the method of killing mosquitoes via electric shock, a pungent smell is produced after the mosquito is shocked, which is not environmentally friendly or safe, and the mosquito killing lamp is not convenient to be cleaned up.

SUMMARY OF THE DISCLOSURE

The technical problem to be solved by the present disclosure is to provide a viscous outdoor mosquito killing lamp, the outdoor mosquito eradication lamp is both safe and environmentally friendly and is convenient to be cleaned.

A technical solution of the present disclosure is to provide a viscous outdoor mosquito killing lamp including a lamp body which includes a housing within which a lighting lamp is disposed. The housing is provided with a trapping chamber, a sidewall of the trapping chamber is provided with a first through hole for flying insects to pass through; a trapping plate is detachably connected to the sidewall of the trapping chamber, and a viscous sticker is attached onto the trapping plate.

Compared to the prior art, the viscous outdoor mosquito killing lamp having the above structure of the present disclosure, has the following advantages that:

Since the trapping plate is detachably connected to the sidewall of the trapping chamber of the viscous outdoor mosquito killing lamp of the present disclosure, the viscous sticker is attached onto the trapping plate, and the viscous sticker on the trapping plate is used to kill mosquitoes, which is safe and environmentally friendly and is convenient to be cleaned up.

As a development, the housing includes an upper housing and a lower housing, the upper housing is interconnected to the lower housing, the upper housing and the lower housing are separated by a partition plate, a space enclosed by the lower housing and the partition plate serves as the trapping chamber, the first through hole is defined on a sidewall of the lower housing, the lighting lamp is disposed within a cavity enclosed by the upper housing and the partition plate. With such a configuration, the housing is divided into a trapping zone and an illumination zone by the partition plate, the rapping zone and the illumination zone are one another independent and don't interfere each other, and such a structure is rationally designed.

As a development, a bottom of the lower housing is provided with a mounting hole, the mounting hole communicates with the trapping chamber; a mounting base is detachably connected to the bottom of the lower housing, the trapping plate is mounted on the mounting base and received within the mounting hole, the viscous sticker positioned on the trapping plate faces the trapping chamber. With such a configuration, the trapping plate is positioned at the bottom of the trapping chamber, and the position of the trapping plate is reasonable; the trapping plate may be replaced through removal of the mounting base, such a structure is simple and convenient for replacement of the viscous sticker on the trapping plate.

As a development, a mounting platform is arranged on an upper end of the mounting base, an upper surface of the mounting platform is provided with a mounting groove, the trapping plate is disposed in the mounting groove; the mounting platform is detachably connected to an inner side of the mounting hole; a sidewall of the mounting hole is provided with a limiting flange, the limiting flange retains the trapping plate within the mounting groove. With such a configuration, the trapping plate has simple and reliable mounting structure.

As a development, an inner wall of the mounting hole is provided with a engaging groove, a sidewall of the mounting platform is provided with a engaging block, the engaging block is engaged in the engaging groove. With such a configuration, the mounting platform and the inner wall of the mounting hole are connected by means of engaging with each other, which is simple in construction and convenient in assembly.

As a development, a mosquito attracting lamp is arranged on the partition plate and is located above the trapping plate, a light emitted by the mosquito attracting lamp irradiates on the trapping plate. With this configuration, the light emitted by the mosquito attracting lamp irradiates on the trapping plate, such that the flying insects are attracted to land on the trapping plate, resulting in a better trapping effect.

As a development, the partition plate is provided with a second through hole, the second through hole is located above the trapping plate; a connecting base is arranged on the partition plate, an inner cavity of the connecting base communicates with the second through hole; the mosquito attracting lamp includes a mosquito attracting lamp board mounted within the connecting base and a mosquito attracting lamp cover mounted within the second through hole and connected to the connecting base, the mosquito attracting lamp cover covers the lamp body disposed on the mosquito attracting lamp board. With such a configuration, the mosquito attracting lamp board and the mosquito attracting lamp cover have simple mounting structure and are convenient to be assembled.

As a development, a sidewall of the connecting base is provided with a plurality of thermal vents. With such a configuration, heat dissipation can be achieved in a timely manner through the thermal vents, which results in better heat dissipation, and can increase the service life of electronic components.

As a development, a hollow connecting column is arranged on the connecting base, an inner cavity of the hollow connecting column communicates with the inner cavity of the connecting base, the connecting column extends into the upper housing; the lighting lamp includes a lighting lamp board disposed on a sidewall of the connecting column, a light emitted by the lighting lamp board passes through the upper housing and transmits to an exterior of the lamp body. With such a configuration, the lighting lamp has simple assembly structure and good lighting effect.

As a development, the upper housing includes a cylindrical lighting lamp shade and a housing cover, a lower end of the lighting lamp shade is connected to the lower housing, and the housing cover is connected at an upper port of the lighting lamp shade; the lighting lamp shade covers an outside of the lighting lamp board. With such a configuration, the upper housing has a simple structure.

As a development, the connecting base is provided with a control board, the mosquito attracting lamp board and the lighting lamp board are electrically connected to the control board. With such a configuration, assembly of the control board is facilitated.

As a development, a battery is mounted in the inner cavity of the connecting column, the battery supplies power to the lighting lamp, the mosquito attracting lamp and the control board.

As a development, an upper surface of the upper housing is provided with a solar panel, the solar panel is electrically connected to the control board, the solar panel is capable of accumulating power for the battery. With such a configuration, electricity is generated by the solar panel, which is energy efficient and environmentally friendly.

As a development, a supporting bar is connected to a lower end of the mounting base, and a lower end of the supporting bar is provided with a pointed cone. With such a configuration, the outdoor mosquito killing lamp can be conveniently inserted into the lawn through the supporting bar.

Figure 1:
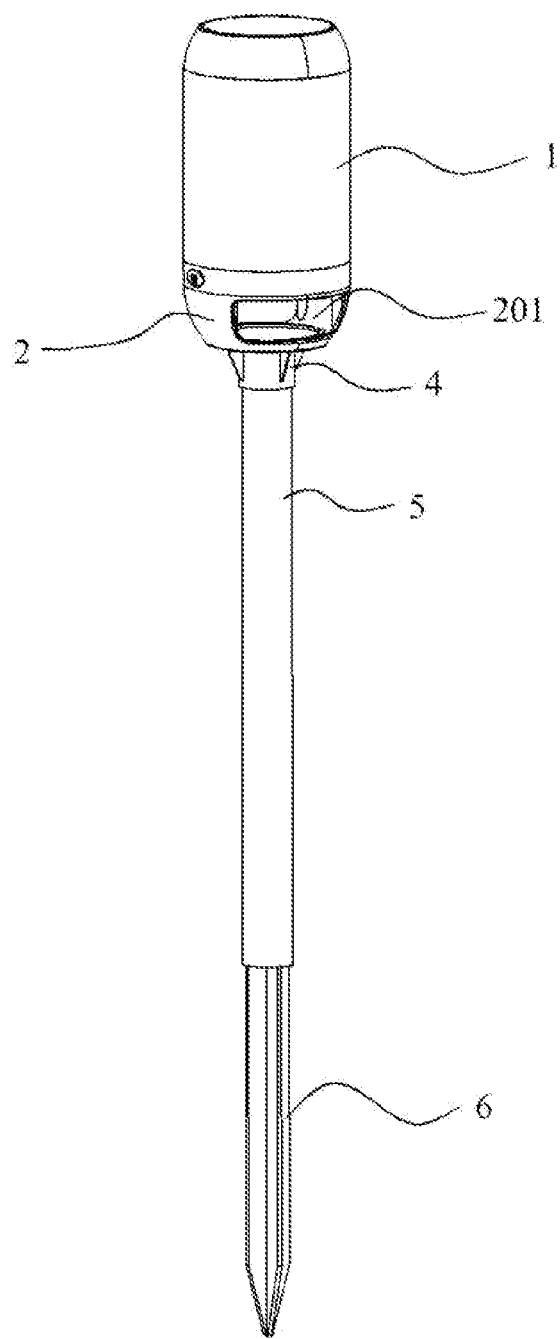
FIG. 1 is a schematic perspective view of the viscous outdoor mosquito killing lamp of the present disclosure.

Reference numbers: 1 upper housing, 101 lighting lamp shade, 102 housing cover, 2 lower housing, 201 trapping chamber, 202 first through hole, 203 mounting hole, 204 engaging groove, 205 limiting flange 3 partition plate, 301 second through hole, 302 connecting base, 303 thermal vent, 4 mounting base, 401 mounting platform, 402 engaging block, 403 mounting groove, 5 supporting bar, 6 pointed cone, 7 mosquito attracting lamp board, 8 mosquito attracting lamp cover, 801 connecting member, 802 hook, 9 viscous sticker, 10 connecting column, 11 control board, 1101 fitting hole, 12 battery, 13 solar panel.

DESCRIPTION OF EMBODIMENTS

For a better understanding of the present disclosure, various aspects of the present disclosure will be explained in more detail with reference to the accompanying drawings. It is to be understood that these detailed descriptions are only illustrative of exemplary embodiments of the present disclosure and are not intended to limit the scope of the present disclosure in any way. The reference numerals refer to the same elements throughout the description.

In the drawings, the thickness, size, and shape of objects have been slightly enlarged for ease of illustration. The drawings are merely examples and are not drawn strictly to scale.

It will be further understood that the terms "includes," "including," "having," "includes," and/or "including," when used in this specification, specify the presence of stated features, integers, steps, operations, elements, and/or components, but do not exclude the presence or addition of one or more other features, integers, steps, operations, elements, components, and/or combination thereof.

Figure 2:
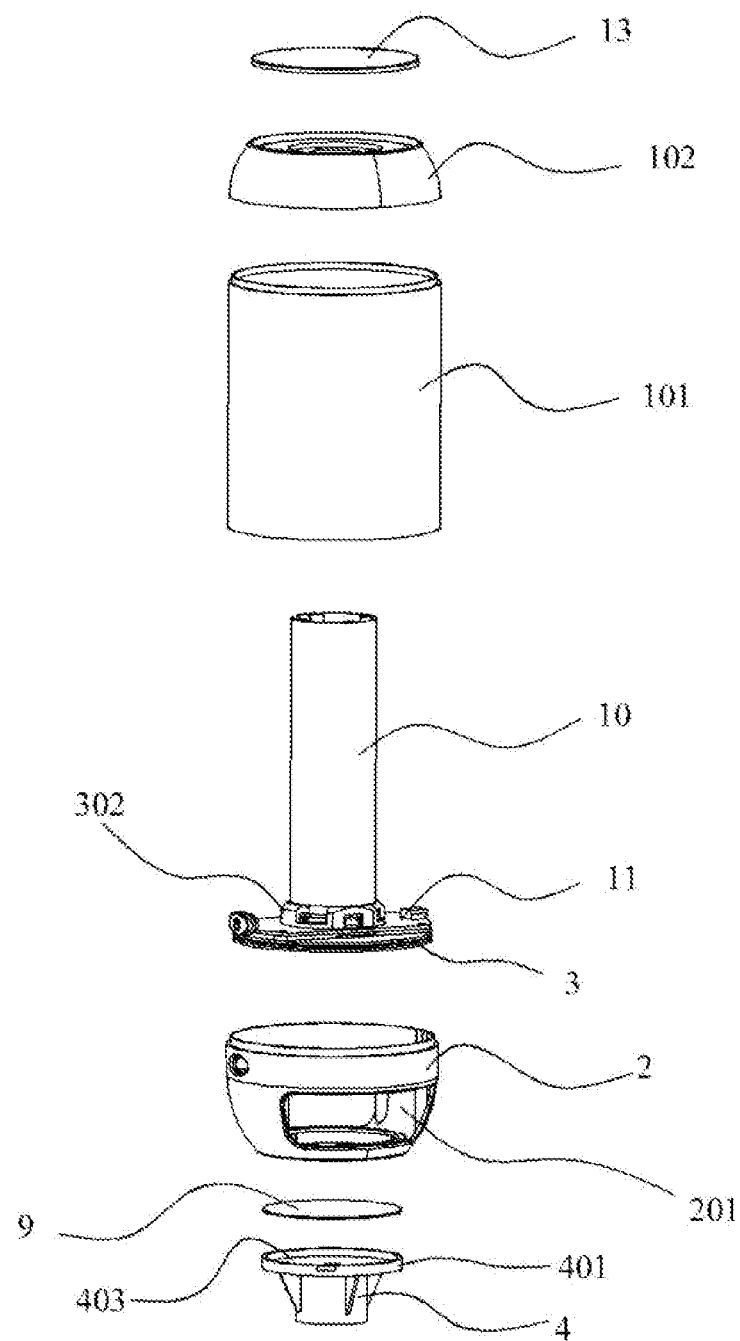
FIG. 2 is a schematic exploded view of the lamp body of the viscous outdoor mosquito killing lamp of the present disclosure.
Figure 3:
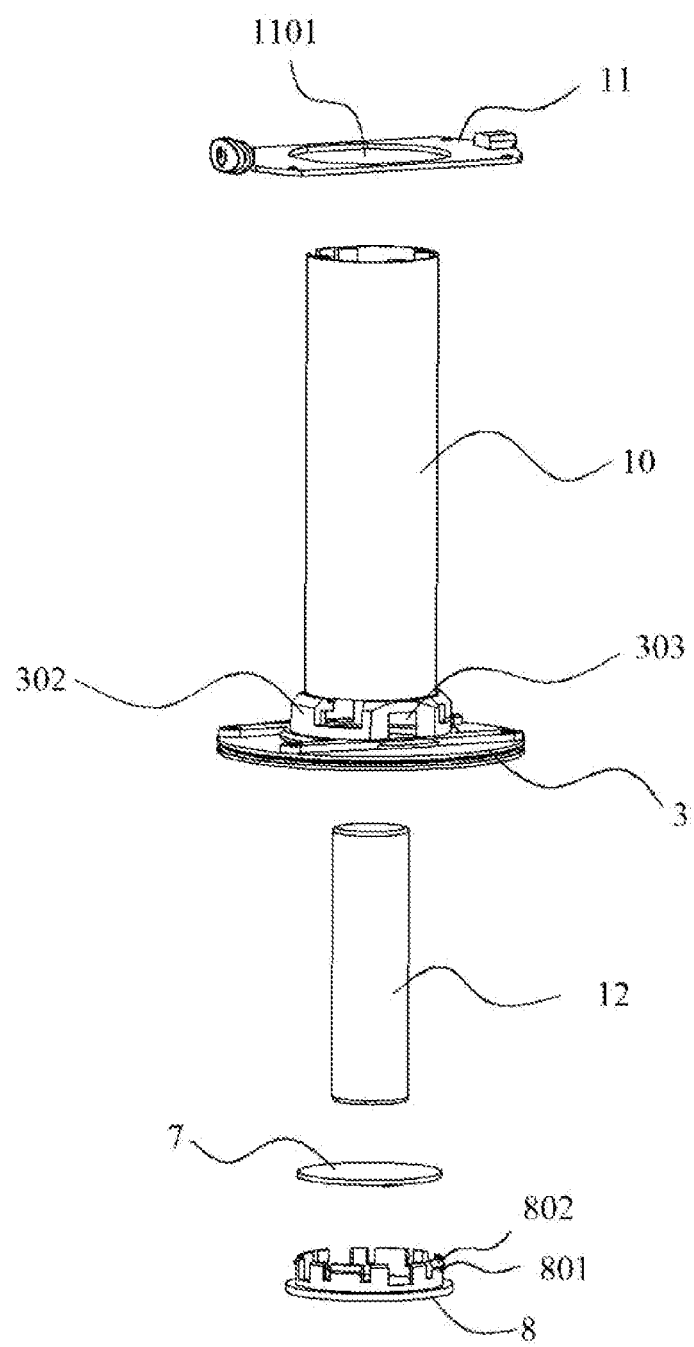
FIG. 3 is a partial schematic exploded view of the lamp body of the viscous outdoor mosquito killing lamp of the present disclosure.
Figure 4:
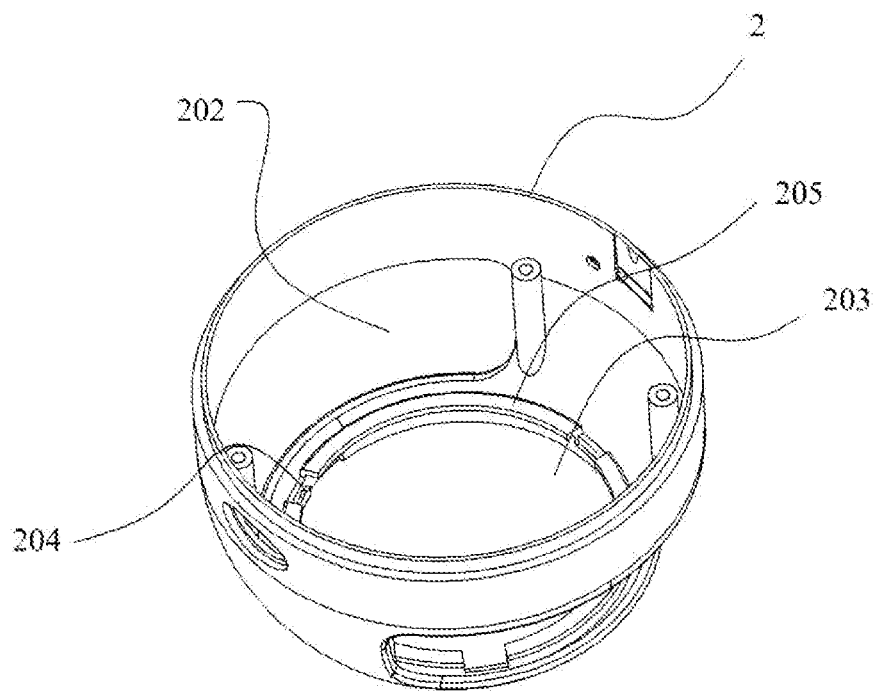
FIG. 4 is a schematic perspective view of the lower housing of the viscous outdoor mosquito killing lamp of the present disclosure.
Figure 5:
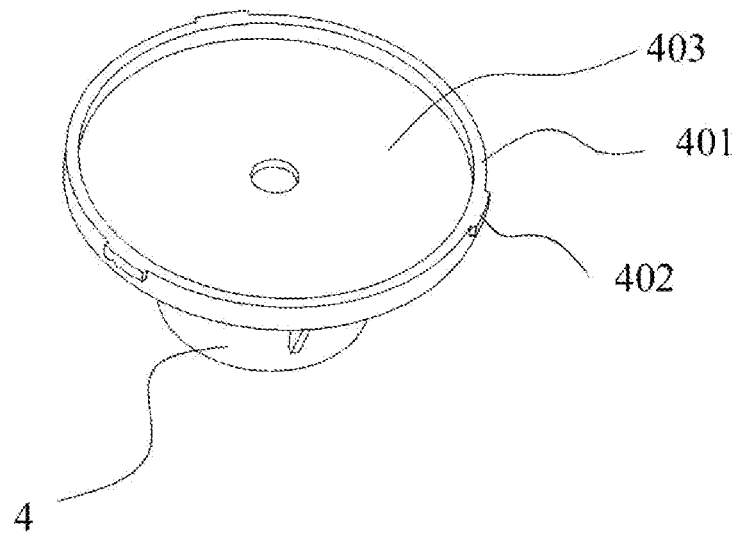
FIG. 5 is a schematic perspective view of the connecting base of the viscous outdoor mosquito killing lamp of the present disclosure.
Figure 6:
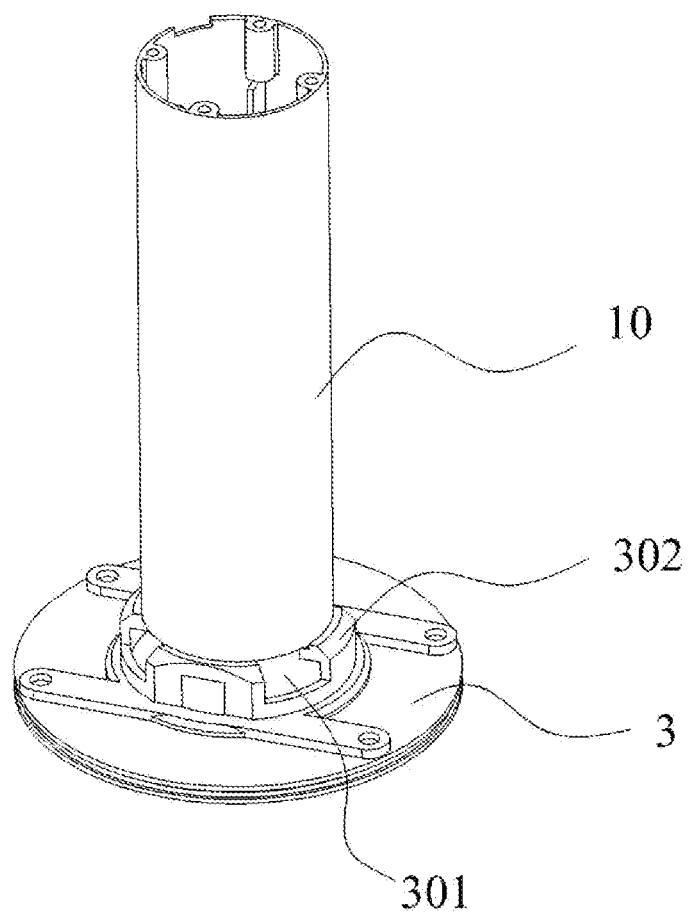
FIG. 6 is a schematic perspective of the partition plate and the connecting column of the viscous outdoor mosquito killing lamp of the present disclosure.
Figure 7:
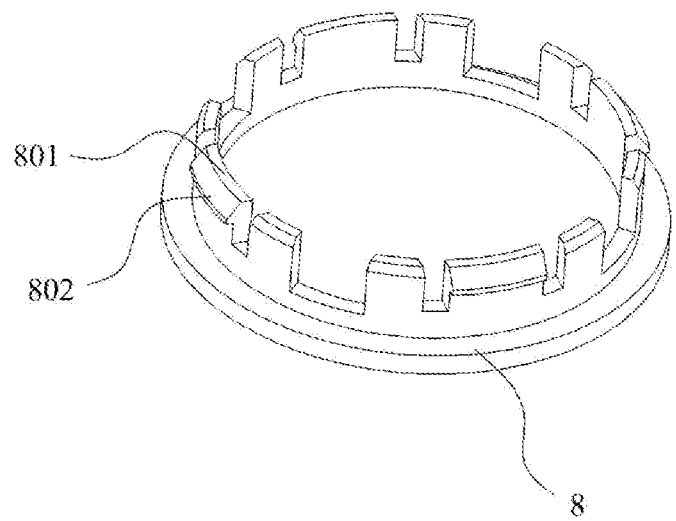
FIG. 7 is a schematic perspective view of the mosquito attracting lamp cover of the viscous outdoor mosquito killing lamp of the present disclosure.

As shown in FIGS. 1-3, the present application discloses a viscous outdoor mosquito killing lamp including a lamp body, the lamp body includes a housing.

The housing includes an upper housing 1 and a lower housing 2, the upper housing 1 and the lower housing 2 are interconnected to each other and separated by a partition plate 3. A space enclosed by the lower housing 2 and the partition plate 3 serves as a trapping chamber 201, a first through hole 202 for flying insects to pass through is defined on a sidewall of the lower housing 2, i.e., on a sidewall of the trapping chamber 201. In this embodiment, two first through holes 202 are provided, the two first through holes 202 are arranged oppositely on the sidewall of the lower housing 2. Each of the first through holes 202 has a large area which is not less than one third of the area of the sidewalls of the lower housing 2.

As shown in FIGS. 4-7, a bottom of the lower housing 2 is provided with a mounting hole 203 communicating with the trapping chamber 201. The bottom of the lower housing 2 is detachably connected to a mounting base 4, a mounting platform 401 is arranged on an upper end of the mounting base 4, an engaging groove 204 is disposed on an inner wall of the mounting hole 203, and an engaging block 402 is disposed on a sidewall of the mounting platform 401, the engaging block 402 is engaged in the engaging groove 204. An upper surface of the mounting platform 401 is provided with a mounting groove 403, and a trapping plate 9 is disposed within the mounting groove 403. A sidewall of the mounting hole 203 is provided with a limiting flange 205, and the limiting flange 205 retains the trapping plate 9 within the mounting groove 403. A viscous sticker positioned on the trapping plate 9 faces the trapping chamber 201. When the mosquito killing lamp is used, the trapping plate 9 inside the mounting groove 403 may be taken out by unscrewing the mounting base 4, so that the viscous sticker positioned the trapping plate 9 may be replaced, which is very convenient. A lower end of the mounting base 4 is connected to a supporting bar 5, and a lower end of the supporting bar 5 is provided with a pointed cone 6.

A second through hole 301 is provided on the partition plate 3, the second through hole 301 is located above the trapping plate 9. A connecting base 302 is arranged on an upper side of the partition plate 3, an inner cavity of the connecting base 302 communicates with the second through hole 301. The mosquito attracting lamp includes a mosquito attracting lamp board 7 and a mosquito attracting lamp cover 8, the mosquito attracting lamp board 7 is mounted in the connecting base 302, and the mosquito attracting lamp cover 8 is mounted in the second through hole 301 and connected to the connecting base 302. The mosquito attracting lamp cover 8 covers the lamp body on the mosquito attracting lamp board 7 and the light emitted by the mosquito attracting lamp transmits to the trapping plate 9. A plurality of thermal vents 303 are disposed on a sidewall of the connecting base 302. An edge of the mosquito attracting lamp cover 8 extends upwardly extending and forms a connecting member 801, the connecting member 801 is provided with hooks 802 each of which snaps into one thermal vent 303.

A lighting lamp (not shown) is disposed in a cavity enclosed by the upper housing 1 and the partition plate 3. A hollow connecting column 10 is arranged on the connecting base 302 is provided with, an inner cavity of the connecting column 10 communicates with the inner cavity of the connecting base 302.

The upper housing 1 includes a cylindrical lighting lamp shade 101 and a housing cover 102, a lower end of the cylindrical lighting lamp shade 101 is connected to the lower housing 2. In this embodiment, the lower end of the cylindrical lighting lamp shade 101 is fixedly connected to the lower housing 2 by fasteners. The lighting lamp includes a lighting lamp board which is arranged on a sidewall of the connecting column 10. The connecting column 10 extends into the upper housing 1, and the lighting lamp shade 101 covers an outside the lighting lamp board, and a light emitted by the lighting lamp board passes through the lighting lamp shade 101 and transmits to an exterior of the lamp body. The housing cover 102 is clamped to an upper port of the lighting lamp shade 101, and the housing cover 102 is fastened to the connecting column 10 by fasteners.

A control board 11 is disposed on the connecting base 302, a central portion of the control board 11 is provided with a fitting hole 1101, the control board 11 is mounted around the connecting column 10, and the control board 11 is fixedly connected to the connecting base 302. Both of the mosquito attracting lamp board 7 and the lighting lamp board are electrically connected to the control board 11. A battery 12 is mounted in the inner cavity of the connecting column 10, and configured for supplying power to the lighting lamp, the mosquito attracting lamp and the control board 11. A solar panel 13 is disposed on an upper surface of the upper housing 1, electrically connected to the control board 11, and capable of accumulating power for the battery 12.

Figure 8:
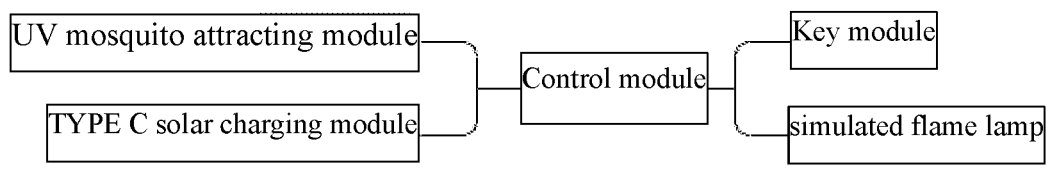
FIG. 8 is a block diagram of the control board of the viscous outdoor mosquito killing lamp of the present disclosure.

As shown in FIG. 8, a control circuit disposed on the control board includes a control module, a key module, a simulated flame lamp module, a mosquito attracting lamp module, and a solar charging module. Each of the key module, the simulated flame lamp module, the mosquito attracting lamp module, and the solar charging module is electrically connected to the control module. The simulated flame lamp module can make a group of lighting lamps present an effect of a flame lamp. The key module is used to control the simulated flame lamp module and the mosquito attracting lamp module to turn on or off. Wherein the mosquito attracting lamp module is configured to control operation of the mosquito attracting lamp, wherein the mosquito attracting lamp is an ultraviolet lamp. The solar charging module is connected to the solar panel, and the electric energy generated by the solar panel can be used to charge the battery through the solar charging module.

When the viscous outdoor mosquito killing lamp disclosed herein is in use, the lighting lamp and the mosquito attracting lamp are turned on, the light emitted by the lighting lamp passes through the lighting lamp cover 101 and transmits to an exterior of the lamp body and the light emitted by the mosquito attracting lamp passes through the mosquito attracting lamp cover 8 and shines on the trapping plate 9. The mosquitoes are attracted by the mosquito attracting lamp and enter the trapping chamber 201, and are sticked on the viscous sticker when landing on the trapping plate 9. After the viscous sticker is used for a period of time, the lamp body and mount 4 may be separated, the trapping plate 9 may be taken out, and the viscous sticker is torn away from the trapping plate 9 and replaced.

The invention claimed is:

1. A viscous outdoor mosquito killing lamp, comprising a lamp body which comprises a housing within which a lighting lamp configured for lighting is disposed; wherein the housing is provided with a trapping chamber, a sidewall of the trapping chamber is provided with a first through hole for flying insects to pass through; a trapping plate is detachably connected to a bottom side of the trapping chamber, and a viscous sticker is attached onto the trapping plate;

wherein the housing comprises an upper housing and a lower housing, the upper housing and the lower housing are interconnected from top to bottom, the upper housing and the lower housing are separated by a partition plate, a space enclosed by the lower housing and the partition plate serves as the trapping chamber, the first through hole is defined on a sidewall of the lower housing, the lighting lamp is disposed within a cavity enclosed by the upper housing and the partition plate;

wherein a mosquito attracting lamp configured for attracting the flying insects is arranged on the partition plate and is located above the trapping plate, a light emitted by the mosquito attracting lamp irradiates on the trapping plate;

wherein the partition plate is provided with a second through hole, the second through hole is located above the trapping plate; a connecting base is arranged on a side of the partition plate facing the upper housing, an inner cavity of the connecting base communicates with the second through hole; the mosquito attracting lamp comprises a mosquito attracting lamp board mounted within the connecting base and a mosquito attracting lamp cover mounted within the second through hole and connected to the connecting base, the mosquito attracting lamp cover covers the lamp body disposed on the mosquito attracting lamp board;

wherein a sidewall of the connecting base is provided with a plurality of thermal vents; and wherein an edge of the mosquito attracting lamp cover extends upwardly and forms a connecting member, the connecting member is provided with a plurality of hooks, and each hook snaps into one corresponding thermal vent.

2. The viscous outdoor mosquito killing lamp according to claim 1, wherein a bottom of the lower housing is provided with a mounting hole, the mounting hole communicates with the trapping chamber; a mounting base is detachably connected to the bottom of the lower housing, the trapping plate is mounted on the mounting base and received within the mounting hole, the viscous sticker positioned on the trapping plate faces the trapping chamber.

3. The viscous outdoor mosquito killing lamp according to claim 2, wherein a mounting platform is arranged on an upper end of the mounting base, an upper surface of the mounting platform is provided with a mounting groove, the trapping plate is disposed in the mounting groove; the mounting platform is detachably connected to an inner side of the mounting hole; a sidewall of the mounting hole is provided with a limiting flange, the limiting flange retains the trapping plate within the mounting groove.

4. The viscous outdoor mosquito killing lamp according to claim 3, wherein an inner wall of the mounting hole is provided with an engaging groove, a sidewall of the mounting platform is provided with an engaging block, the engaging block is engaged in the engaging groove.

5. The viscous outdoor mosquito killing lamp according to claim 2, wherein a supporting bar is connected to a lower end of the mounting base, and a lower end of the supporting bar is provided with a pointed cone.

6. The viscous outdoor mosquito killing lamp according to claim 1, wherein a hollow connecting column is arranged on the connecting base, an inner cavity of the hollow connecting column communicates with the inner cavity of the connecting base, the connecting column extends into the upper housing; the lighting lamp comprises a lighting lamp board disposed on a sidewall of the connecting column, a light emitted by the lighting lamp board passes through the upper housing and transmits to an exterior of the lamp body.

7. The viscous outdoor mosquito killing lamp according to claim 6, wherein the upper housing comprises a cylindrical lighting lamp shade and a housing cover, a lower end of the lighting lamp shade is connected to the lower housing, and the housing cover is connected at an upper port of the lighting lamp shade; the lighting lamp shade covers an outside of the lighting lamp board.

8. The viscous outdoor mosquito killing lamp according to claim 6, wherein the connecting base is provided with a control board, the mosquito attracting lamp board and the lighting lamp board are electrically connected to the control board.

9. The viscous outdoor mosquito killing lamp according to claim 8, wherein a battery is mounted in the inner cavity of the connecting column, the battery supplies power to the lighting lamp, the mosquito attracting lamp and the control board.

10. The viscous outdoor mosquito killing lamp according to claim 8, wherein an upper surface of the upper housing is provided with a solar panel, the solar panel is electrically connected to the control board, and the solar panel is capable of accumulating power for the battery.

* * * * *